United States Patent [19]

Sano et al.

[11] Patent Number: 5,437,716
[45] Date of Patent: Aug. 1, 1995

[54] RECORDING LIQUID

[75] Inventors: Hideo Sano; Tomio Yoneyama; Yukichi Murata, all of Kanagawa; Masahiro Yamada, Tokyo, all of Japan

[73] Assignee: Mitsubishi Kasei Corporation, Tokyo, Japan

[21] Appl. No.: 242,627

[22] Filed: May 13, 1994

[30] Foreign Application Priority Data

May 13, 1993 [JP] Japan .................................. 5-111575
May 20, 1993 [JP] Japan .................................. 5-118493

[51] Int. Cl.$^6$ ............................................. C09D 11/02
[52] U.S. Cl. .................................... 106/22 K; 106/200
[58] Field of Search ............................. 106/22 K, 20 D

[56] References Cited

U.S. PATENT DOCUMENTS

| | | | |
|---|---|---|---|
| 4,756,838 | 8/1988 | Ohata et al. | 106/22 K |
| 4,963,189 | 10/1990 | Hindagolla | 106/22 |
| 5,053,495 | 10/1991 | Greenwood et al. | 106/22 K |
| 5,176,703 | 12/1992 | Eida et al. | 106/22 K |
| 5,198,022 | 3/1993 | Aulick et al. | 106/22 K |
| 5,203,912 | 4/1993 | Greenwood et al. | 106/22 K |
| 5,213,614 | 5/1993 | Eida et al. | 106/22 K |
| 5,215,577 | 6/1993 | Eida et al. | 106/22 K |

FOREIGN PATENT DOCUMENTS

| | | | |
|---|---|---|---|
| 0495520 | 7/1992 | European Pat. Off. | 106/22 K |
| 243176 | 12/1985 | Japan | 106/22 K |

*Primary Examiner*—Helene Klemanski
*Attorney, Agent, or Firm*—Sughrue, Mion, Zinn, Macpeak & Seas

[57] ABSTRACT

A recording liquid comprising an aqueous medium and at least one dye selected from dyes, free acid forms of which are represented by formulae (I) and (II):

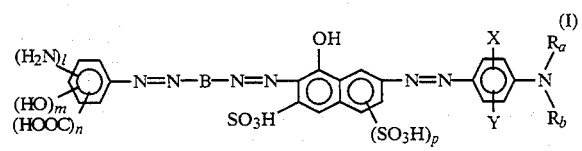

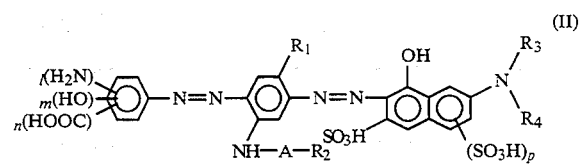

The symbols in formulae (I) and (II) are defined in the specification.

13 Claims, No Drawings

RECORDING LIQUID

FIELD OF THE INVENTION

The present invention relates to a recording liquid. More particularly, it relates to a recording liquid suitable for ink-jet recording.

BACKGROUND OF THE INVENTION

The so-called ink-jet recording method has come into practical use in which droplets of a recording liquid containing a water-soluble colorant, e.g., a direct dye or an acid dye, are issued from a minute ejection orifice and adhered onto a receiving material, e.g., paper, to conduct recording.

The recording liquid is required not only to be stably ejectable over a long time period and to rapidly fix to recording papers for general business use, e.g., paper for PPCs (plain-paper copiers), e.g., electrophotographic paper, and fanfold paper (continuous paper for computers, etc.), to give a print in which the printed characters are of good quality, that is, the printed characters are free of blurring and have clear contours, but also to be excellent in the shelf stability of the recording liquid. Therefore, solvents usable in the recording liquid are severely restricted.

The colorants for the recording liquid are required, for example, not only to have sufficient solubility in the solvents that are restricted as described above to thereby enable the recording liquid to be stable even in long-term storage, but also to give printed images having high density and excellent water resistance and light resistance. However, it has been difficult to satisfy these many requirements simultaneously.

Although various techniques (e.g., JP-A-55-144067, JP-A-57-30773, JP-A-57-207660, JP-A-58-147470, JP-A-62-190269, JP-A-62-190271, JP-A-62-190272, JP-A-62-250082, JP-A-62-246975, JP-A-62-257971, JP-A-62-288659, JP-A-63-8463, JP-A-63-22867, JP-A-63-22874, JP-A-63-30567, JP-A-63-33484, JP-A-63-63764, JP-A-63-105079, JP-A-64-31877, JP-A-1-93389, JP-A-1-210464, JP-A-2-140270, JP-A-3-167270, JP-A-3-200882, etc.) have hence been proposed, a colorant has not been developed which sufficiently meets the performance requirements of the market and is easy to produce. (The term "JP-A" used herein means an "unexamined published Japanese patent application.")

SUMMARY OF THE INVENTION

An object of the present invention is to provide a black recording liquid which is good in print quality when used in ink-jet recording, writing, etc. to conduct recording on plain paper; which gives recorded images having high density and excellent in light resistance and, in particular, in water resistance and recorded-image color tone; and which has good stability in long-term storage. The recording liquid exhibits good performance to give recorded images having high density and excellent in water resistance when recorded not only on neutral paper but also on acidic or alkaline paper.

Other objects and effects of the present invention will be apparent from the following description.

The present inventors have ascertained that the objects of the present invention can be accomplished when a specific dye is used as a recording liquid component to thereby complete the present invention.

The present invention relates to a recording liquid comprising an aqueous medium and at least one dye selected from dyes, the free acid forms of which are represented by formulae (I) and (II):

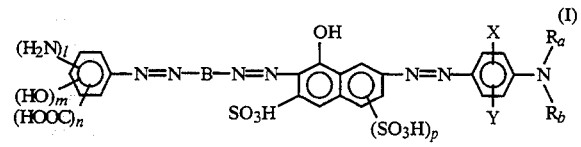

wherein B represents a phenylene group or a naphthylene group, which each may have a substituent; X and Y each represents a hydrogen atom, a substituted or unsubstituted alkyl group having from 1 to 7 carbon atoms, or a substituted or unsubstituted alkoxy group having from 1 to 9 carbon atoms, provided that the total carbon number of the groups represented by X and Y is at least 3 when both X and Y are not a hydrogen atom, and is at least 2 when one of X and Y represents a hydrogen atom; $R_a$ and $R_b$ each represents a hydrogen atom, an alkyl group having from 1 to 3 carbon atoms which has a carboxyl group (—COOH) as a substituent, or a hydroxyalkyl group having from 2 to 4 carbon atoms; λ, m, and p each represents 0 or 1; and n represents 0, 1, or 2,

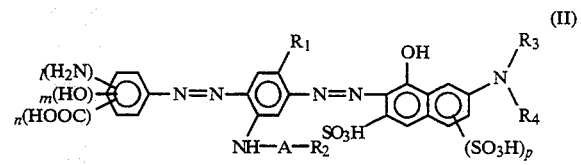

wherein $R_1$ represents a substituted or unsubstituted alkoxy group having from 2 to 9 carbon atoms; $R_2$ represents an alkyl group having from 1 to 12 carbon atoms or a substituted or unsubstituted aryl group having from 6 to 12 carbon atoms; A represents —CO— or —SO$_2$—; $R_3$ represents a hydrogen atom, a phenyl group which may have a sulfo group (—SO$_3$H) or a carboxyl group as a substituent, or an alkyl group having from 1 to 3 carbon atoms which has a carboxyl group as a substituent; $R_4$ represents a hydrogen atom or an alkyl group having from 1 to 3 carbon atoms which has a carboxyl group as a substituent; λ, m, and p each represents 0 or 1; and n represents 0, 1, or 2.

DETAILED DESCRIPTION OF THE INVENTION

The dye, the free acid form of which represented by formula (I), is described in detail below.

Examples of the substituent for the phenylene group represented by B include a substituted or unsubstituted alkyl group having from 1 to 7 carbon atoms; a substituted or unsubstituted alkoxy group having from 1 to 9 carbon atoms; an acylamino group such as an alkylcarbonylamino group having from 1 to 6 carbon atoms and an arylcarbonylamino group having from 7 to 12 carbon atoms; a sulfo group; and a carboxyl group. Examples of the substituent for the naphthylene group represented by B include a sulfo group, a carboxyl group, and an alkoxy group having from 1 to 4 carbon atoms. The number of the substituent for the group represented by B may be one or more, and preferably one or two.

X and Y each represents a hydrogen atom, an alkyl group having from 1 to 7 carbon atoms, or an alkoxy group having from 1 to 9 carbon atoms. Examples of the substituent for the alkyl group include a phenyl group. Examples of the substituent for the alkoxy group include an alkoxy group having from 1 to 7 carbon atoms, a carboxyl group, a hydroxyl group, a phenyl group, and a benzyloxy group.

n represents 0, 1, or 2, and preferably 1 or 2.

In a preferred embodiment of the present invention,

B represents a phenylene group which may have one or two of substituents selected from the group consisting of an alkyl group having from 1 to 6 carbon atoms, an alkoxy group having from 1 to 6 carbon atoms, an alkylcarbonylamino group having from 2 to 6 carbon atoms, a benzoylamino group, a sulfo group, and a carboxyl group; or a naphthylene group which may have one or two substituents selected from the group consisting of an alkoxy group having from 1 to 4 carbon atoms, a sulfo group, and a carboxyl group; and X and Y each represents a hydrogen atom, an alkyl group having from 1 to 7 carbon atoms, an alkoxy group having from 1 to 9 carbon atoms, or an alkoxy group having from 1 to 7 carbon atoms having an alkoxy group having from 1 to 7 carbon atoms, a carboxyl group, a hydroxyl group, or a phenyl group as a substituent.

In a more preferred embodiment of the present invention,

B represents a substituted phenylene group represented by

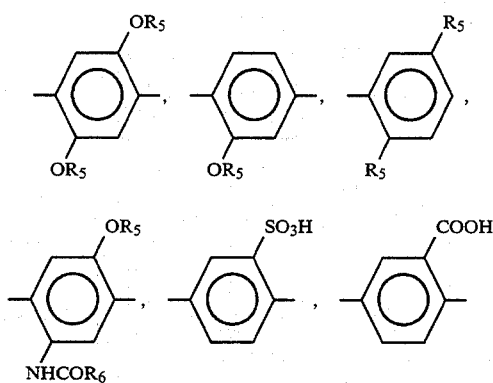

wherein $R_5$ represents an alkyl group having from 1 to 6 carbon atoms and $R_6$ represents an alkyl group having from 1 to 5 carbon atoms or a phenyl group, or a substituted naphthylene group represented by

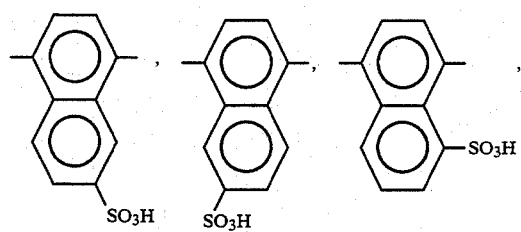

-continued

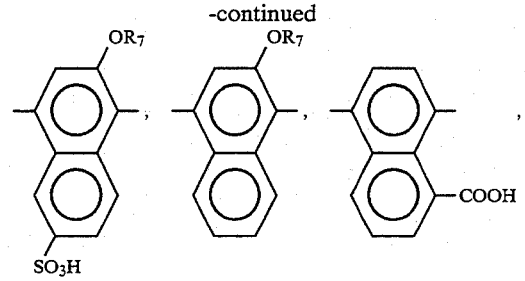

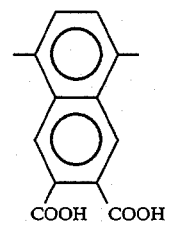

wherein $R_7$ represents an alkyl group having from 1 to 4 carbon atoms;

X represents a hydrogen atom, an alkyl group having from 1 to 3 carbon atoms, an alkoxy group having from 1 to 4 carbon atoms, or an alkoxy group having from 1 to 4 carbon atoms which has an alkoxy group having from 1 to 4 carbon atoms, a hydroxyl group, a carboxyl group, or a phenyl group as a substituent;

Y has the same meaning as X as mentioned above, except for a hydrogen atom;

provided that the total carbon number of the groups represented by X and Y is at least 3 when X is not a hydrogen atom, and is at least 2 when X is a hydrogen atom;

λ and m each represents 0;

p represents 0 or 1; and n represents 1 or 2.

The dye, the free acid form of which is represented by formula (II), is described in detail below.

Examples of the substituent for the alkoxy group represented by $R_1$ include an alkoxy group, a hydroxyl group, a hydoxyalkoxy group, a phenyl group, a carboxyl group, and an alkoxy group having a carboxyl group as a substituent (carboxyalkoxy group).

Examples of the aryl group having from 6 to 12 carbon atoms represented by $R_2$ include an unsubstituted aryl group such as a phenyl group and a naphthyl group; or a substituted aryl group such as a phenyl or naphthyl group which has an alkyl group having from 1 to 6 carbon atoms or an alkoxy group having from 1 to 6 carbon atoms as a substituent, provided that the total carbon number of the naphthyl group and the substituent is from 6 to 12.

In a preferred embodiment of the present invention, $R_1$ represents an unsubstituted alkoxy group having from 2 to 6 carbon atoms or an alkoxy group having from 2 to 6 carbon atoms which has an alkoxy group having from 1 to 6 carbon atoms, a hydroxyalkoxy group, a carboxyalkoxy group, a phenyl group, or a carboxyl group as a substituent;

$R_2$ represents an alkyl group having from 1 to 9 carbon atoms, a phenyl group, or a phenyl group having an alkyl group having 1 to 4 carbon atoms as a substituent;

$R_3$ represents a hydrogen atom, a phenyl group which may have a sulfo group or one or two carboxyl groups as a substituent, or an alkyl group having from 1 to 3 carbon atoms which has a carboxyl group as a substituent;

$R_4$ represents a hydrogen atom or an alkyl group having from 1 to 3 carbon atoms which has a carboxyl group as a substituent;

n represents 1 or 2;

λ and m each represents 0; and p represents 0 or 1.

In a more preferred embodiment of the present invention, $R_1$ represents an unsubstituted alkoxy group having from 2 to 4 carbon atoms; $R_2$ represents an alkyl group having from 1 to 6 carbon atoms; A represents —CO—; $R_3$ and $R_4$ each represents a hydrogen atom; n represents 1 or 2; λ and m each represents 0; and p represents 0 or 1.

In a particularly preferred embodiment of the present invention, $R_1$ represents an ethoxy group; $R_2$ represents an alkyl group having from 1 to 4 carbon atoms; A represents —CO—; $R_3$ and $R_4$ each represents a hydrogen atom; n represents 1 or 2; λ and m each represents 0; and p represents 0 or 1.

The dyes of the present invention may be used in the form of a free acid as represented by formulae (I) and (II) or in the form of a salt. The dyes may also be used in the form in which a part of the acid groups are in the form of a salt and the remaining part is in the form of a free acid. The dyes in a free acid form and those in a salt form may be used in combination as a mixture.

Examples of the salt form of the dyes of the present invention include salts of an alkali metal such as Na, Li, and K; salts of an ammonium which may have an alkyl group or a hydroxyalkyl group as a substituent; and salt of an organic amine. Examples of the organic amine include a lower alkylamine, a hydroxy-substituted lower alkylamine, a carboxy-substituted lower alkylamine, and a polyamine having from 2 to 10 alkyleneimine units each having from 2 to 4 carbon atoms. The dyes in a salt form may be used singly or in combination of two or more different salt forms.

Where the molecule of the dye of the present invention contains plural groups of a salt form, they may be the same salt form or different salt forms.

Specific examples of the dyes used in the present invention include azo dyes Nos. I-1 to I-21 and Nos. II-1 to II-37 shown below.

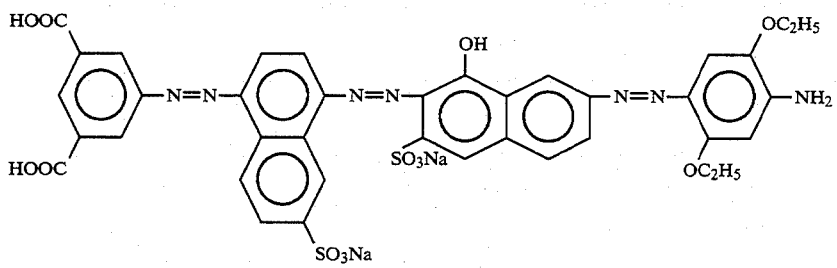

I-1

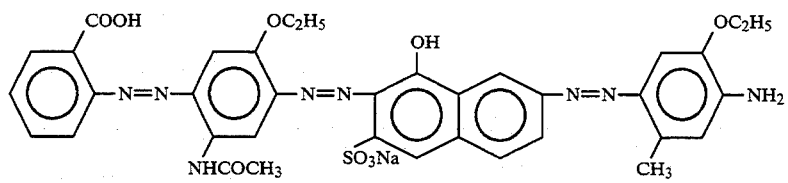

I-2

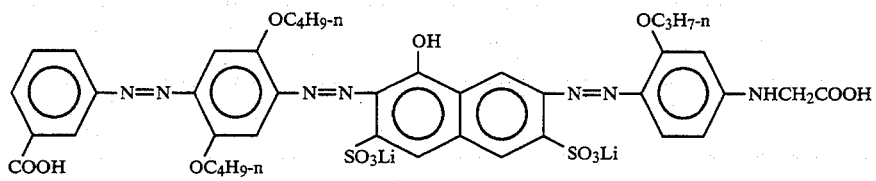

I-3

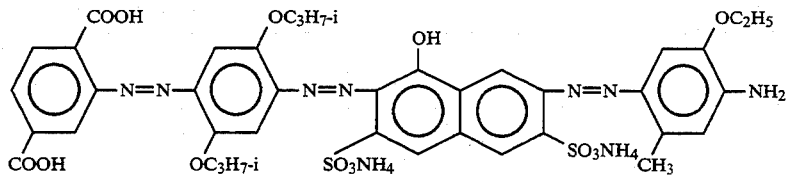

I-4

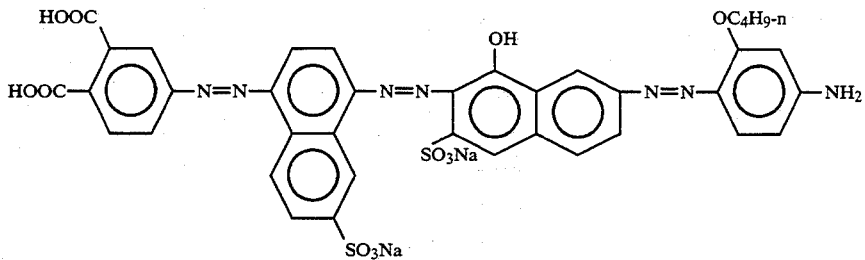

I-5

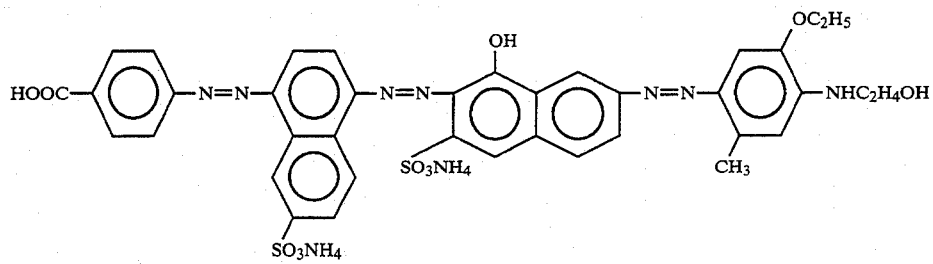
I-6
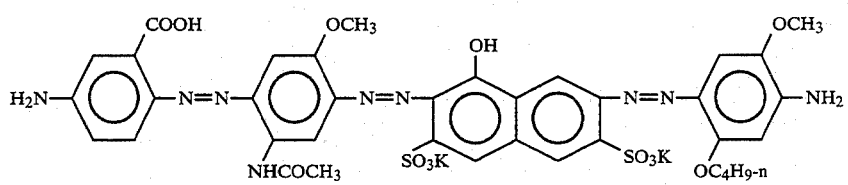
I-7
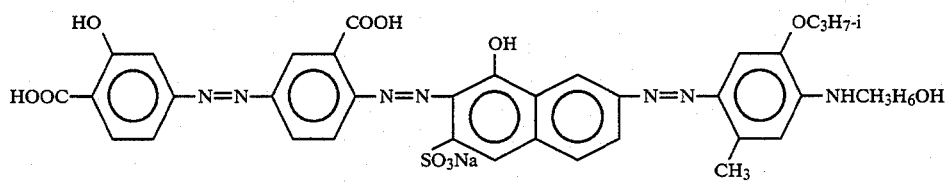
I-8
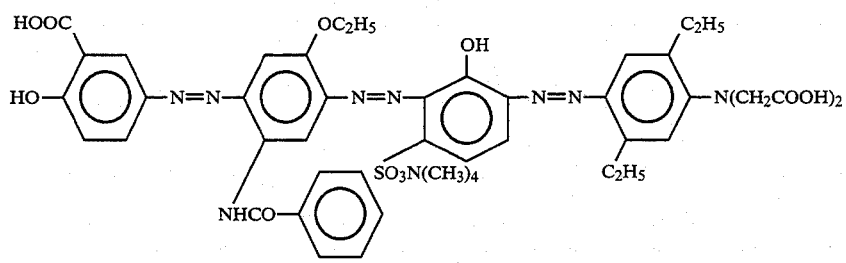
I-9
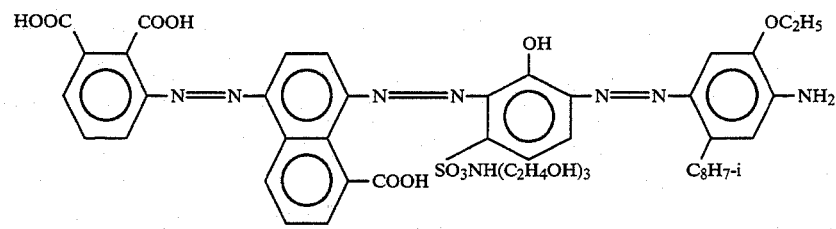
I-10
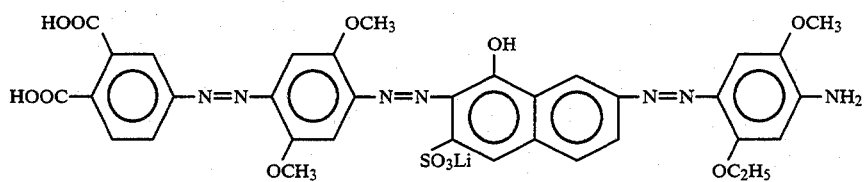
I-11
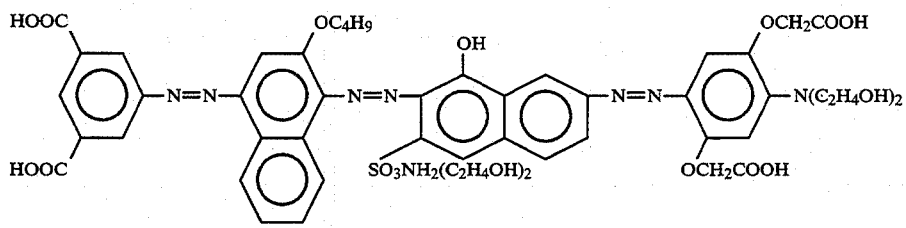
I-12

-continued
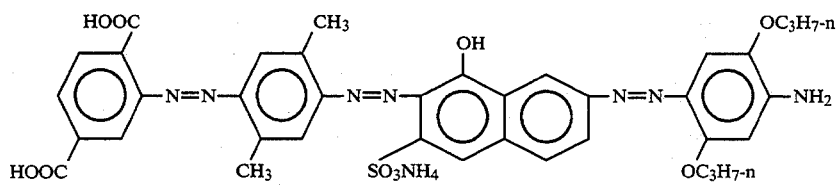 I-13
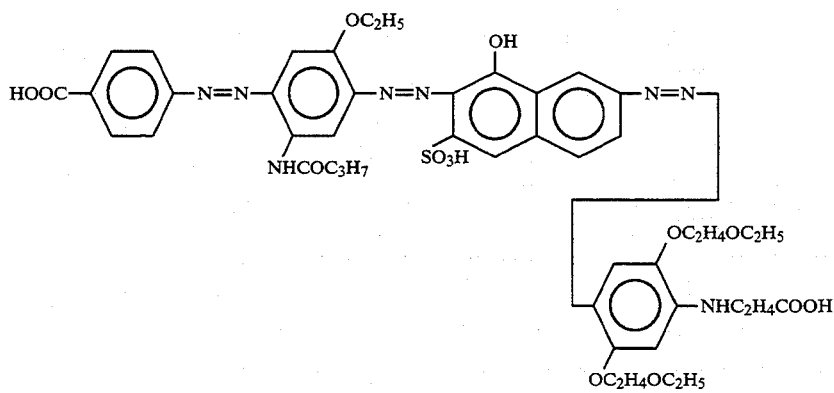 I-14
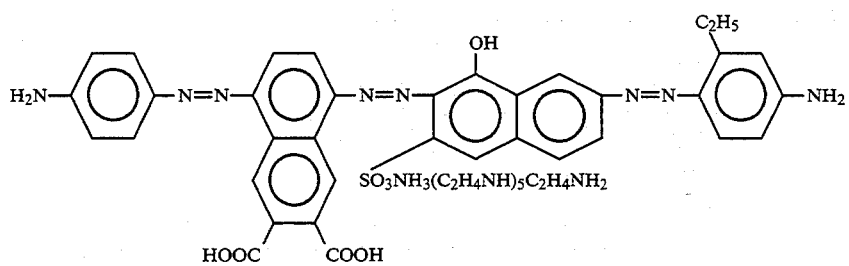 I-15
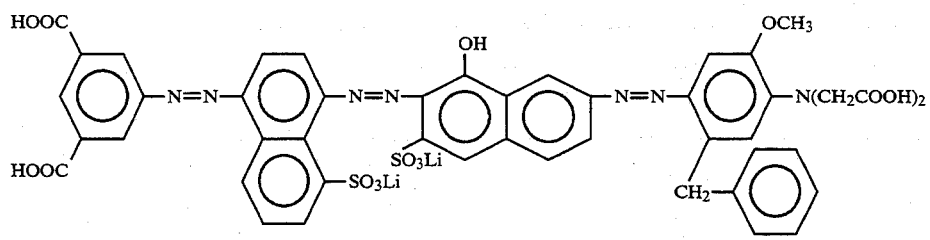 I-16
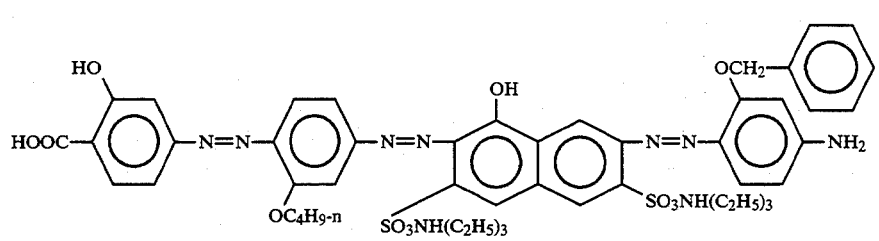 I-17
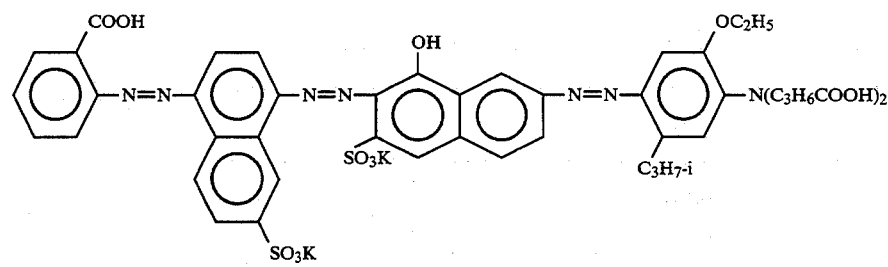 I-18

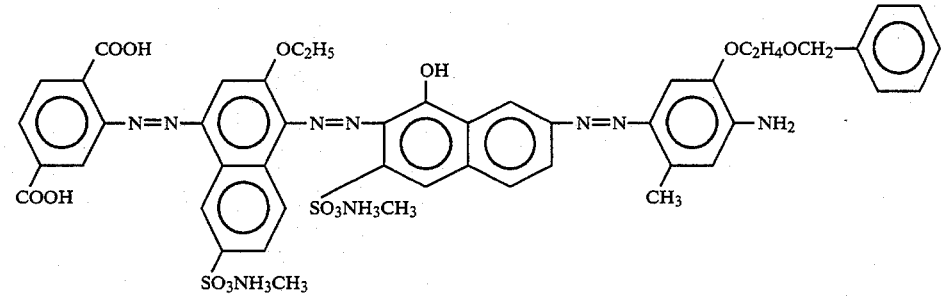
I-19
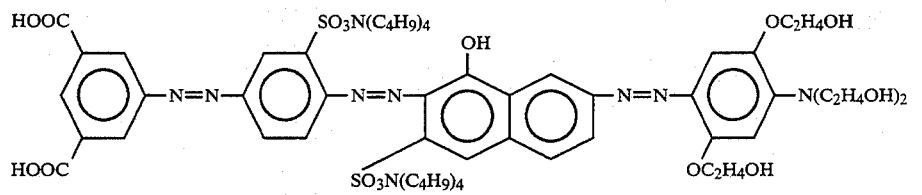
I-20
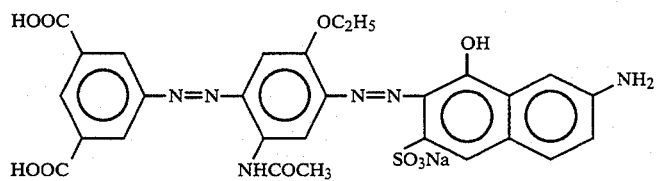
II-1
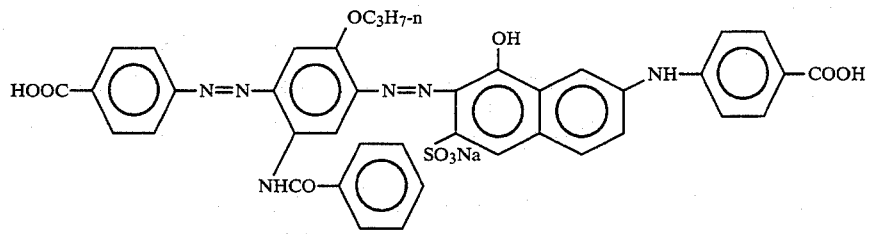
II-2
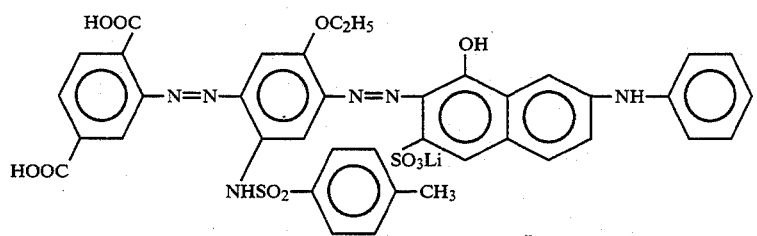
II-3
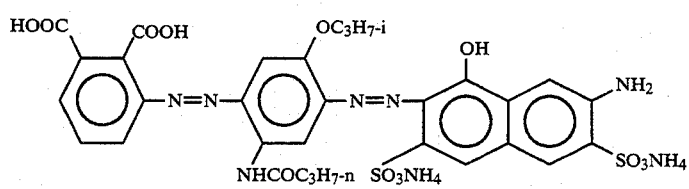
II-4
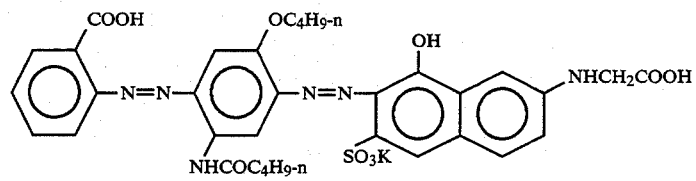
II-5

-continued
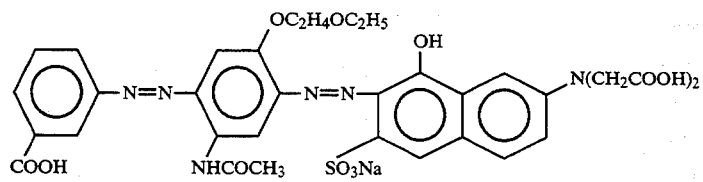
II-6
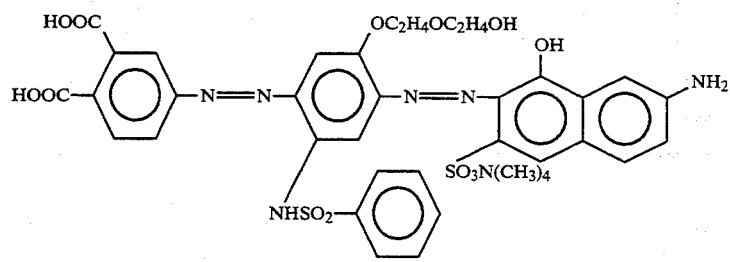
II-7
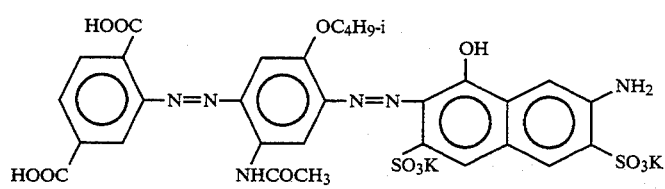
II-8
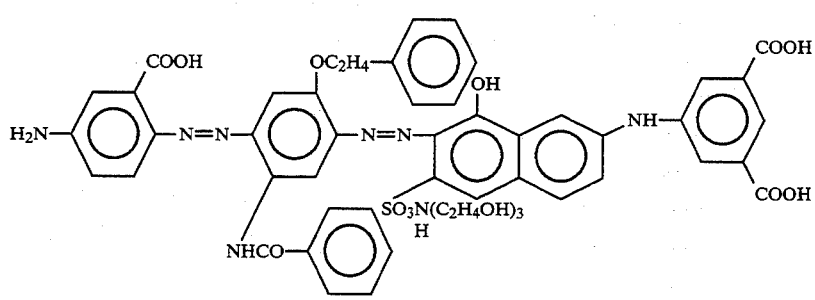
II-9
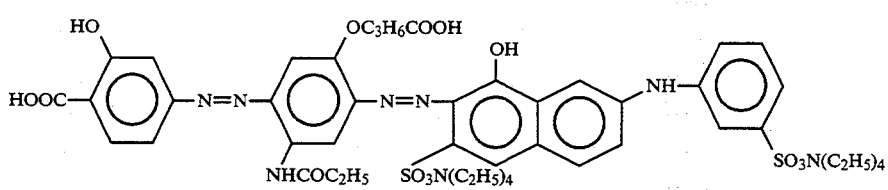
II-10
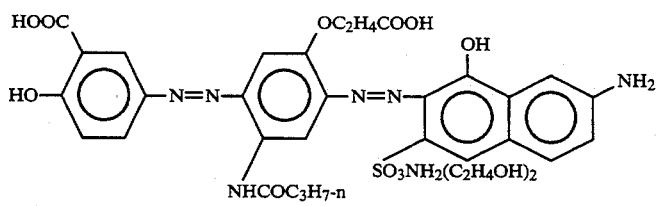
II-11
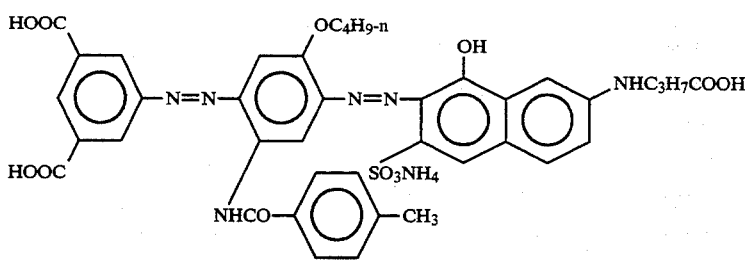
II-12

-continued
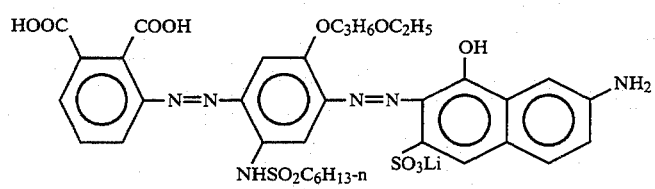
II-13
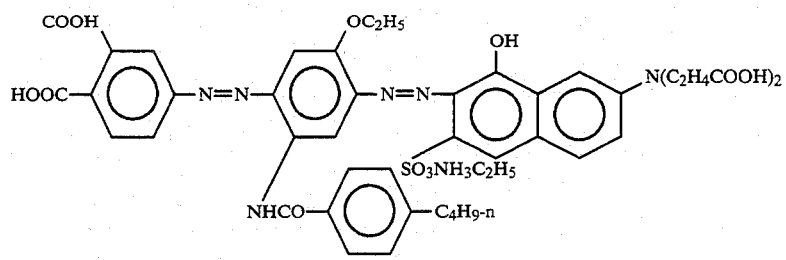
II-14
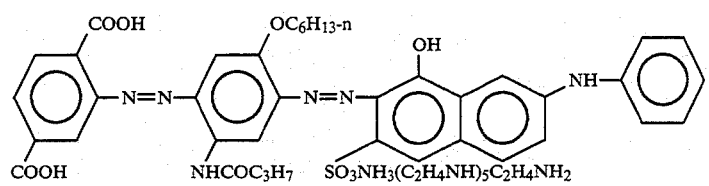
II-15
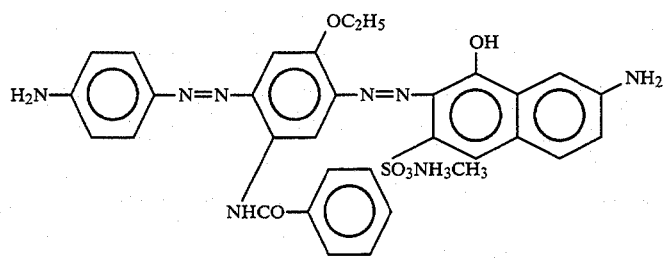
II-16
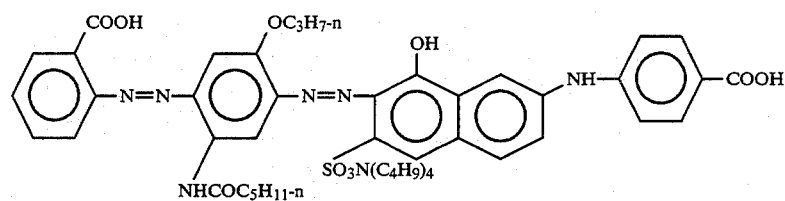
II-17
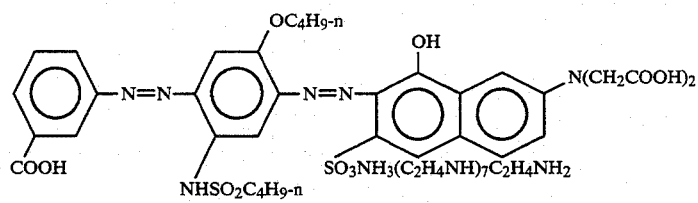
II-18
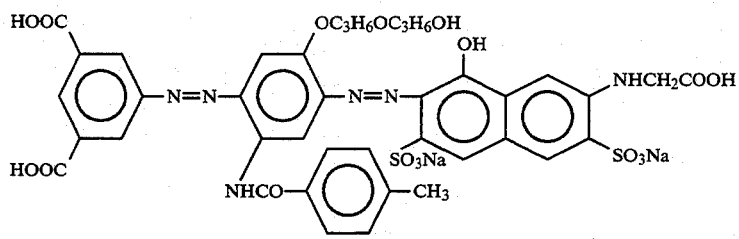
II-19

-continued
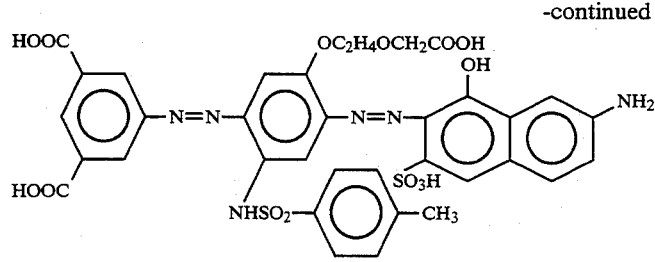
II-20
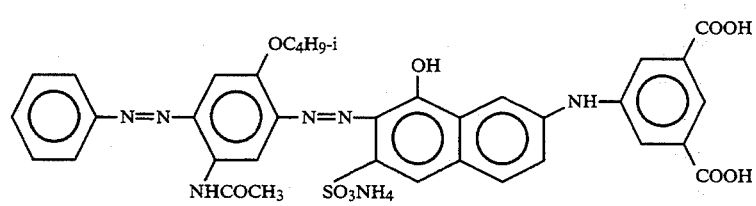
II-21
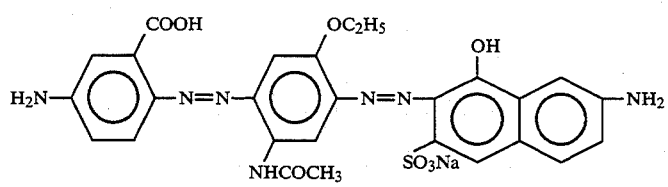
II-22
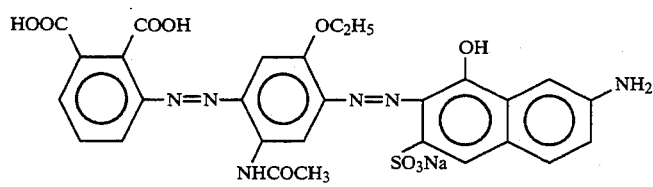
II-23
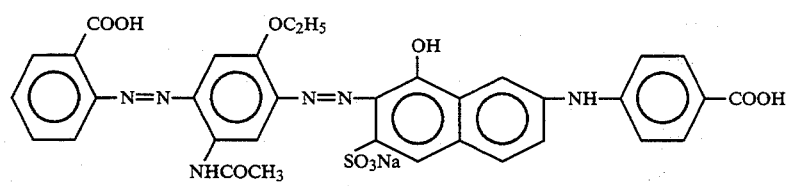
II-24
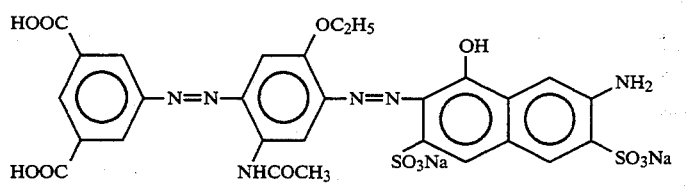
II-25
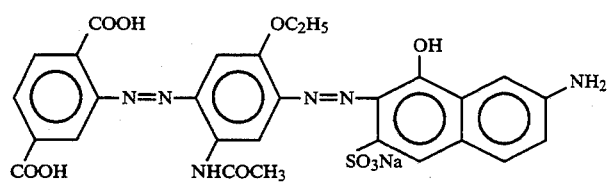
II-26
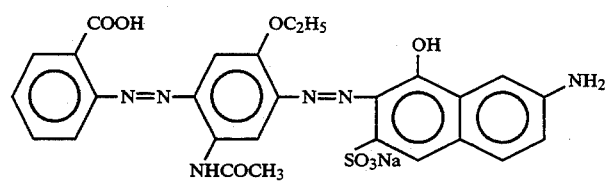
II-27

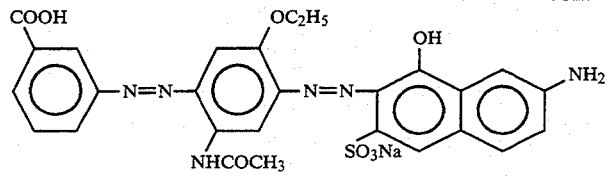
II-28
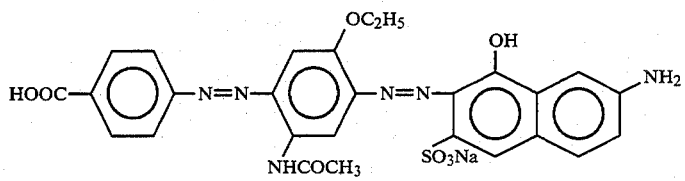
II-29
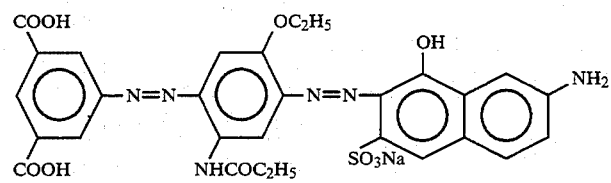
II-30
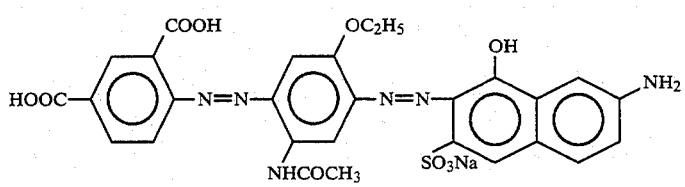
II-31
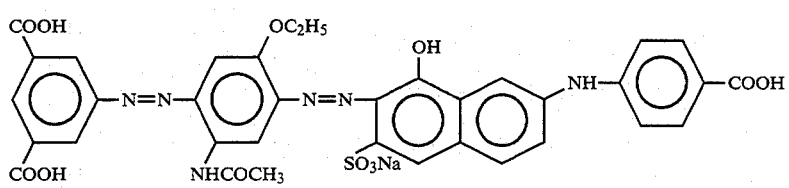
II-32
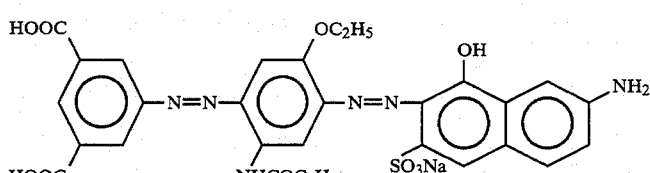
II-33
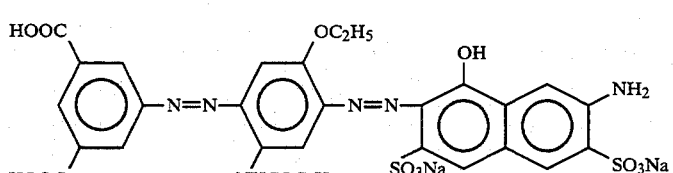
II-34
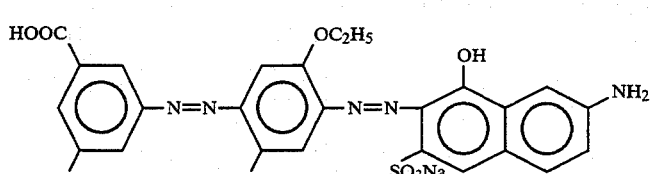
II-35
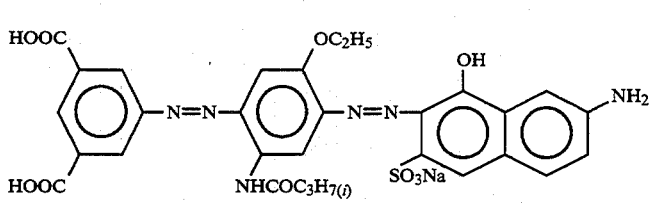
II-36

II-37

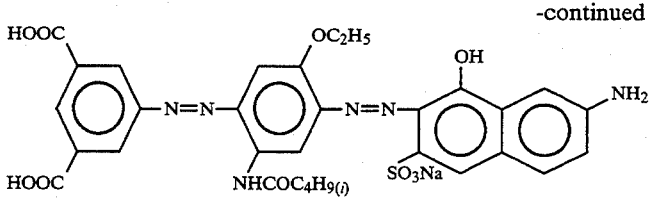

The dyes, the free acid forms of which is represented by formulae (I) and (II), (hereinafter referred simply as the dyes represented by formulae (I) and (II)) can be produced through diazotization and coupling steps according to methods which themselves are known (as described, e.g., in *Shin Senryo Kagaku* (New Dye Chemistry) written by Y. Hosoda, published by Gihodo (Japan) on Dec. 21, 1973, pp. 396 to 409.

Specifically, the dyes represented by formula (I), the dye No. I-1 for example, can be produced in the following manner:

(A) A monoazo compound is produced from 5-aminoisophthalic acid and 1,7-Cleve's acid through diazotization and coupling steps in an ordinary manner.

(B) A disazo compound is produced from the resulting monoazo compound and 7-amino-1-hydroxy-3-sulfonic acid (γ-acid) through diazotization and coupling steps in an ordinary manner.

(C) A trisazo compound is produced from the resulting disazo compound and 2,5-diethoxyaniline through diazotization and coupling steps in an ordinary manner.

(D) The desired dye No. I-1 is taken out from the reaction mixture by adding sodium chloride to cause salting out.

The dyes represented by formula (II), the dye No. II-1 for example, can be produced in the following manner:

(A) A monoazo compound is produced from 5-aminoisophthalic acid and 2-ethoxy-5-acetylaminoanilin through diazotization and coupling steps in an ordinary manner.

(B) A disazo compound is produced from the resulting monoazo compound and 7-amino-1-hydroxy-3-sulfonic acid (γ-acid) through diazotization and coupling steps in an ordinary manner.

(C) The desired dye No. II-1 is taken our from the reaction mixture by adding sodium chloride to cause salting out.

The dyes obtained, e.g., by the above-described methods, can be used after purification in a conventional manner or may be used as a recording liquid in the form of an aqueous reaction mixture without purification. In the case where the recording liquid is used for an ink-jet recording method, the dyes are preferably used after purification to prevent clogging of an ink-jet orifice due to impurities.

The content of the dyes represented by formulae (I) and (II) in the recording liquid of the present invention is generally from 0.5 to 5% by weight, and preferably from 2 to 4% by weight, based on the total amount of the recording liquid.

In the recording liquid of the present invention, the dyes represented by formula (I) and (II) may be used in combination, but the dye represented by formula (II) is more preferred in comparison to the dye represented by formula (I).

Examples of the aqueous medium used in the recording liquid of the present invention include water and water containing a water-soluble organic solvent which, for example, includes ethylene glycol, propylene glycol, butylene glycol, diethylene glycol, triethylene glycol, polyethylene glycol (#200), polyethylene glycol (#400), glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, 2-pyrrolidone, sulfolane, ethanol, isopropanol, etc. These water-soluble organic solvents are generally used in an amount of from 1 to 50% by weight based on the total amount of the recording liquid. Water is generally used in an amount in the range of 45 to 95% by weight based on the total amount of the recording liquid.

The property of quick drying after printing and print quality can be further improved by adding a compound selected from urea, thiourea, biuret, and semicarbazide to the recording liquid of the present invention in an amount of 0.1 to 10% by weight, preferably 0.5 to 5% by weight, based on the total amount of the recording liquid, or by adding a surfactant in an amount of 0.001 to 5.0% by weight based on the total amount of the recording liquid.

When the recording liquid of the present invention is used for a ink-jet recording method, the pH of the recording liquid is preferably adjusted to the range of from 7 to 11 with an alkali.

The present invention will be described in more detail with reference to the following Examples and Comparative Examples, but the present invention is not construed as being limited thereto.

EXAMPLE 1

Water was added to 10 parts by weight of diethylene glycol, 3 parts by weight of isopropanol, and 3 parts by weight of the dye No. II-1 specified above, and the pH of the resulting mixture was adjusted to 9 by adding an aqueous ammonia, to make the total amount to 100 parts by weight. The resulting composition was thoroughly mixed to dissolve the components, filtered under pressure through a Teflon filter having a pore diameter of 1 μm, and then degassed by evacuation and ultrasonic application, to prepare a recording liquid.

Ink-jet recording was conducted using the recording liquid prepared above on paper for electrophotography (manufactured by Xerox Co.) with an ink-jet printer (neutral paper, trade name HG-3000, manufactured by Epson Co.), to obtain a black printed image having a high density. Evaluations were conducted according to the following methods (a), (b), and (c), and the results thereof are shown.

(a) Light Resistance of Recorded Image:

Using a xenon fademeter (manufactured by Suga Shikenki Co.), the recording paper was irradiated for 100 hours. After the irradiation, little discoloration or fading was observed.

(b) Water Resistance of Recorded Image:

The recording paper was immersed in water for 5 minutes. The image was examined for blurring with naked eyes, and the optical density (OD) of the printed area was measured with a Macbeth densitometer (TR927).

The blurring of the image was slight, and the OD remaining ratio defined by the following formula was 92.5%.

$$\text{OD remaining ratio (\%)} = \frac{\text{OD after immersion in water}}{\text{OD before immersion in water}} \times 100$$

(c) Shelf Stability of Recording Liquid:

The recording liquid was placed in sealed Teflon containers. After the recording liquid was stored for 1 month at 5° C. and 60° C., it was examined for any change. Precipitation of an insoluble matter was not observed.

EXAMPLE 2

Water was added to 5 parts by weight of glycerol, 10 parts by weight of ethylene glycol, and 2.5 parts by weight of the dye No. II-2 specified above, and the pH of the the resulting mixture was adjusted to 9 by adding an aqueous ammonia, to make the total amount to 100 parts by weight. The resulting composition was treated in the same manner as in Example 1 to prepare a recording liquid.

Ink-jet recording was conducted in the same manner as in Example 1 to obtain a black printed image having a high density. Evaluations were conducted according to the methods (a), (b), and (c) described in Example 1. The evaluation by the methods (a) and (c), gave the similar satisfactory results as in Example 1. In the evaluation by the method (b), the blurring of the image was slight as similar to Example 1, and the OD remaining ratio was 94.5%.

EXAMPLE 3

Water was added to 10 parts by weight of diethylene glycol, 5 parts by weight of N-methylpirrolidone, and 3 parts by weight of the dye No. II-3 specified above, and the pH of the resulting mixture was adjusted to 9 by adding an aqueous ammonia, to make the total amount to 100 parts by weight. The resulting composition was treated in the same manner as in Example 1 to prepare a recording liquid.

Ink-jet recording was conducted in the same manner as in Example 1 to obtain a black printed image having a high density. Evaluations were conducted according to the methods (a), (b), and (c) described in Example 1. The evaluation by the methods (a) and (c), gave the similar satisfactory results as in Example 1. In the evaluation by the method (b), the blurring of the image was slight as similar to Example 1, and the OD remaining ratio was 95.0%.

EXAMPLES 4 TO 41

Recording liquids were prepared by the same manner as in Example 1 except that each of the dyes Nos. I-1, I-4 to I-20 and the dyes Nos. II-4 to II-23 specified above was used in place of the dye No. II-1 used in Example 1, and the evaluations according to the methods (a) to (c) in Example 1 were conducted, provided that in the method (b), only the blurring of the image was evaluated. As a result, all the evaluations gave the similar satisfactory results as in Example 1.

EXAMPLES 42 TO 50

Recording liquids were prepared by the same manner as in Example 1 except that each of the dyes shown in Table 1 below was used in place of the dye No. II-1 used in Example 1, and the evaluations according to the methods (a) to (c) in Example 1 were conducted. The evaluation by the methods (a) and (c), gave the similar satisfactory results as in Example 1. In the evaluation by the method (b), the blurring of the image was slight as similar to Example 1. The OD and the OD remaining ratio obtained are shown in Table 1.

TABLE 1

| Example | Dye No. | OD before immersion in water | OD remaining ratio (%) |
| --- | --- | --- | --- |
| 42 | II-24 | 1.23 | 92.2 |
| 43 | II-28 | 1.18 | 87.7 |
| 44 | II-29 | 1.42 | 86.8 |
| 45 | II-30 | 1.37 | 89.9 |
| 46 | II-31 | 1.40 | 87.4 |
| 47 | II-32 | 1.30 | 88.7 |
| 48 | II-35 | 1.35 | 81.5 |
| 49 | II-36 | 1.26 | 85.7 |
| 50 | II-37 | 1.26 | 86.8 |

EXAMPLE 51

A recording liquid was prepared by the same manner as in Example 1 except that the dye No. I-2 specified above was used in place of the dye No. II-2 used in Example 2, and the evaluations according to the methods (a) to (c) in Example 1 were conducted. As a result, all the evaluations gave the similar satisfactory results as in Example 1.

EXAMPLE 52

A recording liquid was prepared by the same manner as in Example 3 except that the dye No. I-3 specified above was used in place of the dye No. II-3 used in Example 3, and the evaluations according to the methods (a) to (c) in Example 1 were conducted. As a result, all the evaluations gave the similar satisfactory results as in Example 1.

As described in the foregoing, the recording liquid according to the present invention is suitable for ink-jet recording, writing, etc. to conduct recording on plain paper, and gives black recorded images having high density and excellent in light resistance and water resistance. The recording liquid also has good stability in long-term storage.

While the invention has been described in detail and with reference to specific embodiments thereof, it will be apparent to one skilled in the art that various changes and modifications can be made therein without departing from the spirit and scope thereof.

What is claimed is:

1. A recording liquid comprising an aqueous medium and at least one dye selected from dyes, the free acid forms of which are represented by formulae (I) and (II):

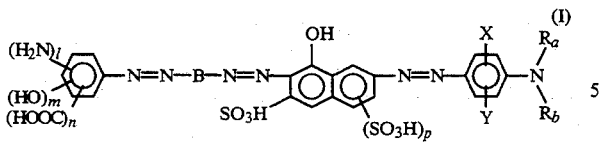

wherein
B represents a phenylene group or a naphthylene group, which each may have a substituent;
X and Y each represents a hydrogen atom, a substituted or unsubstituted alkyl group having from 1 to 7 carbon atoms, or a substituted or unsubstituted alkoxy group having from 1 to 9 carbon atoms, provided that the total carbon number of the groups represented by X and Y is at least 3 when both X and Y are not a hydrogen atom, and is at least 2 when one of X and Y represents a hydrogen atom;
$R_a$ and $R_b$ each represents a hydrogen atom, an alkyl group having from 1 to 3 carbon atoms which has a carboxyl group as a substituent, or a hydroxyalkyl group having from 2 to 4 carbon atoms;
λ, m, and p each represents 0 or 1; and
n represents 0, 1, or 2,

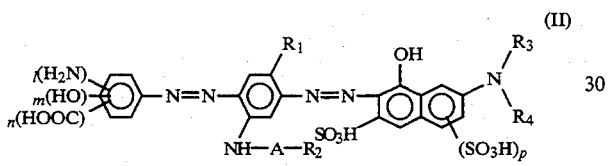

wherein
$R_1$ represents a substituted or unsubstituted alkoxy group having from 2 to 9 carbon atoms;
$R_2$ represents an alkyl group having from 1 to 12 carbon atoms or a substituted or unsubstituted aryl group having from 6 to 12 carbon atoms;
A represents —CO— or —SO$_2$—;
$R_3$ represents a hydrogen atom, a phenyl group which may have a sulfo group or a carboxyl group as a substituent, or an alkyl group having from 1 to 3 carbon atoms which has a carboxyl group as a substituent;
$R_4$ represents a hydrogen atom or an alkyl group having from 1 to 3 carbon atoms which has a carboxyl group as a substituent;
λ, m, and p each represents 0 or 1; and
n represents 1 or 2.

2. A recording liquid comprising an aqueous medium and at least one dye selected from dyes, free acid forms of which are represented by formula (I);

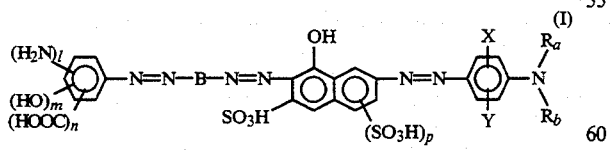

wherein B represents a phenylene group or a naphthylene group, which each may have a substituent;
X and Y each represents a hydrogen atom, a substituted or unsubstituted alkyl group having from 1 to 7 carbon atoms, or a substituted or unsubstituted alkoxy group having from 1 to 9 carbon atoms, provided that the total carbon number of the groups represented by X and Y is at least 3 when both X and Y are not a hydrogen atom, and is at least 2 when one of X and Y represents a hydrogen atom;
$R_a$ and $R_b$ each represents a hydrogen atom, an alkyl group having from 1 to 3 carbon atoms which has a carboxyl group as a substituent, or a hydroxyalkyl group having from 2 to 4 carbon atoms;
λ, m and p each represents 0 or 1; and
n represents 0, 1, or 2.

3. A recording liquid as claimed in claim 1, wherein said recording liquid comprises at least one dye selected from dyes, free acid forms of which are represented by formula (II).

4. A recording liquid as claimed in claim 2, wherein
B represents a phenylene group which may have one or two substituents selected from the group consisting of a substituted or unsubstituted alkyl group having from 1 to 7 carbon atoms, a substituted or unsubstituted alkoxy group having from 1 to 9 carbon atoms, an alkylcarbonylamino group having from 2 to 6 carbon atoms, an arylcarbonylamino group having from 7 to 12 carbon atoms, a sulfo group, and a carboxyl group; or a naphthylene group which may have a substituent selected from the group consisting of a sulfo group, a carboxyl group, and an alkoxy group having from 1 to 4 carbon atoms;
X and Y each represents a hydrogen atom, an alkyl group having from 1 to 7 carbon atoms, an alkyl group having from 1 to 7 carbon atoms which has a phenyl group as a substituent, an alkoxy group having from 1 to 9 carbon atoms, or an alkoxy group having from 1 to 9 carbon atoms which has an alkoxy group having from 1 to 7 carbon atoms, a carboxyl group, a hydroxyl group, a phenyl group, or a benzyloxy group as a substituent, provided that the total carbon number of the groups represented by X and Y is at least 3 when both X and Y are not a hydrogen atom, and the total carbon number of the groups represented by X and Y is at least 2 when one of X and Y represents a hydrogen atom;
$R_a$ and $R_b$ each represents a hydrogen atom, an alkyl group having from 1 to 3 carbon atoms which has a carboxyl group as a substituent, or a hydroxyalkyl group having from 2 to 4 carbon atoms;
λ, m, and p each represents 0 or 1; and
n represents 1 or 2.

5. A recording liquid as claimed in claim 2, wherein
B represents a substituted phenylene group represented by

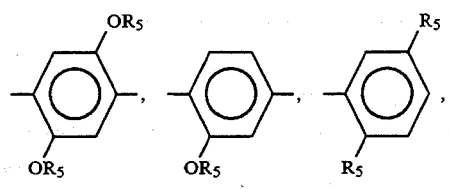

-continued

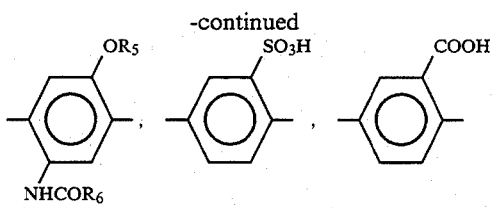

wherein R$_5$ represents an alkyl group having from 1 to 6 carbon atoms, and R$_6$ represents an alkyl group having from 1 to 5 carbon atoms or a phenyl group, or a substituted naphthylene group represented by

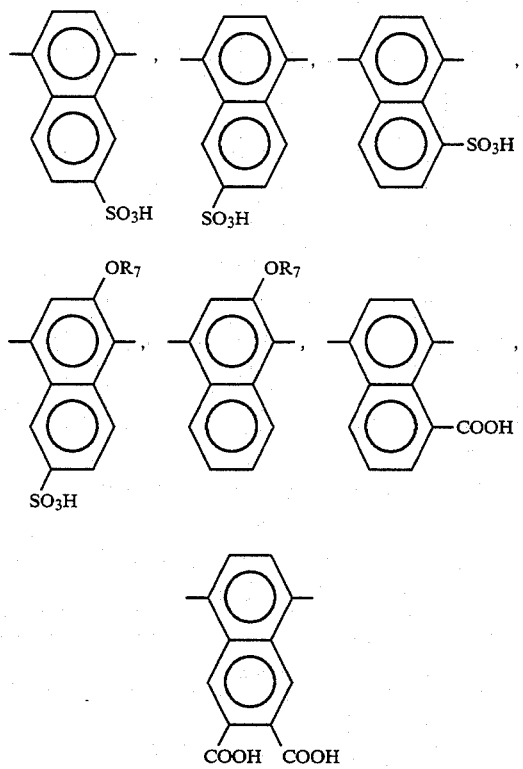

wherein R$_7$ represents an alkyl group having from 1 to 4 carbon atoms;

X represents a hydrogen atom, an alkyl group having from 1 to 3 carbon atoms, an alkoxy group having from 1 to 4 carbon atoms, or an alkoxy group having from 1 to 4 carbon atoms which has an alkoxy group having from 1 to 4 carbon atoms, a hydroxyl group, a carboxyl group, or a phenyl group as a substituent;

Y has the same meaning as X, except for a hydrogen atom;

provided that the total carbon number of the groups represented by X and Y is at least 3 when X is not a hydrogen atom, and is at least 2 when X is a hydrogen atom;

R$_a$ and R$_b$ each represents a hydrogen atom, an alkyl group having from 1 to 3 carbon atoms which has a carboxyl group as a substituent, or a hydroxyalkyl group having from 2 to 4 carbon atoms;

λ and m each represents 0;

p represents 0 or 1; and n represents 1 or 2.

6. A recording liquid comprising an aqueous medium and at least one dye selected from dyes, free acid forms of which are represented by formula (II):

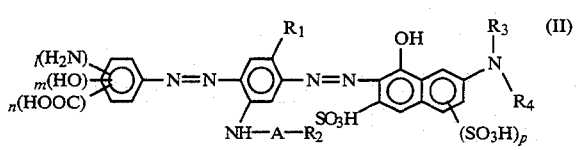

wherein

R$_1$ represents an alkoxy group having from 2 to 9 carbon atoms which may have an alkoxy group, a hydroxyl group, a hydroxyalkoxy group, a phenyl group, a carboxyl group, or a carboxyalkoxy group as a substituent;

R$_2$ represents an alkyl group having from 1 to 12 carbon atoms, a phenyl group, a naphthyl group, or a phenyl or naphthyl group which has an alkyl group having from 1 to 6 carbon atoms or an alkoxy group having from 1 to 6 carbon atoms as a substituent, provided that the total carbon number of said naphthyl group and said substituent is from 6 to 12;

A represents —CO— or —SO$_2$—;

R$_3$ represents a hydrogen atom, a phenyl group which may have a sulfo group or one or two carboxyl groups as a substituent, or an alkyl group having from 1 to 3 carbon atoms having a carboxyl group as a substituent;

R$_4$ represents a hydrogen atom or an alkyl group having from 1 to 3 carbon atoms which has a carboxyl group as a substituent;

n represents 1 or 2;

λ and m each represents 0; and p represents 0 or 1.

7. A recording liquid comprising an aqueous medium and at least one dye selected from dyes, free acid forms of which are represented by formula (II):

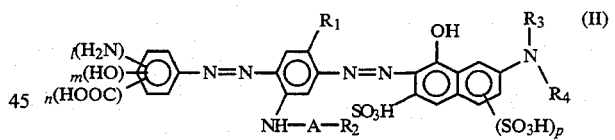

wherein

R$_1$ represents an unsubstituted alkoxy group having from 2 to 6 carbon atoms or an alkoxy group having from 2 to 6 carbon atoms which has an alkoxy group having from 1 to 6 carbon atoms, a hydroxyalkoxy group, a carboxyalkoxy group, a phenyl group, or a carboxyl group as a substituent;

R$_2$ represents an alkyl group having from 1 to 9 carbon atoms, a phenyl group, or a phenyl group which has an alkyl group having from 1 to 4 carbon atoms as a substituent;

A represents —CO— or —SO$_2$—;

R$_3$ represents a hydrogen atom, a phenyl group which may have a sulfo group or one or two carboxyl groups as a substituent, or an alkyl group having from 1 to 3 carbon atoms which has a carboxyl group as a substituent;

R$_4$ represents a hydrogen atom or an alkyl group having from 1 to 3 carbon atoms which has a carboxyl group as a substitutent;

n represents 1 or 2;

λ and m each represents 0; and
p represents 0 or 1.

8. A recording liquid comprising an aqueous medium and at least one dye selected from dyes, free acid forms of which are represented by formula (II):

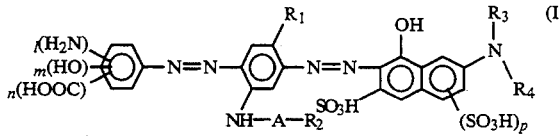

wherein
$R_1$ represents an unsubstituted alkoxy group having from 2 to 4 carbon atoms;
$R_2$ represents an alkyl group having from 1 to 6 carbon atoms;
A represents —CO—;
$R_3$ and $R_4$ each represents a hydrogen atom;
n represents 1 or 2;
λ and M each represents 0; and
p represents 0 or 1.

9. A recording liquid comprising an aqueous medium and at least one dye selected from dyes, free acid forms of which are represented by formula (II):

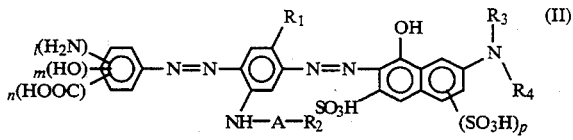

wherein $R_1$ represents an ethoxy group; $R_2$ represents an alkyl group having from 1 to 4 carbon atoms; A represents —CO—; $R_3$ and $R_4$ each represents a hydrogen atom; n represents 1 or 2; λ and m each represents 0; and p represents 0 or 1.

10. A recording liquid as claimed in claim 1, wherein said aqueous medium comprises water and a water-soluble organic solvent selected from the group consisting of ethylene glycol, propylene glycol, butylene glycol, diethylene glycol, triethylene glycol, polyethylene glycol (#200), polyethylene glycol (#400), glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethanol, and isopropanol.

11. A recording liquid as claimed in claim 10, wherein the amount of said water-soluble organic solvent is from 1 to 50% by weight based on the total amount of said recording liquid, and the amount of said water is from 45 to 95% by weight based on the total amount of said recording liquid.

12. A recording liquid as claimed in claim 1, wherein the amount of said dyes represented by formulae (I) and (II) is from 0.5 to 5% by weight based on the total amount of the recording liquid.

13. A ink-jet recording method comprising the steps of: issuing droplets of a recording liquid from an ejection orifice; and adhering said droplets onto a receiving material, said recording liquid comprising an aqueous medium and at least one dye selected from dyes, the free acid forms of which are represented by formulae (I) and (II):

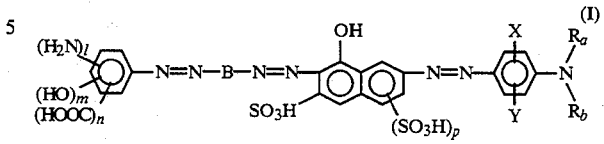

wherein
B represents a phenylene group or a naphthylene group, which each may have a substituent;
X and Y each represents a hydrogen atom, a substituted or unsubstituted alkyl group having from 1 to 7 carbon atoms, or a substituted or unsubstituted alkoxy group having from 1 to 9 carbon atoms, provided that the total carbon number of the groups represented by X and Y is at least 3 when both X and Y are not a hydrogen atom, and is at least 2 when one of X and Y represents a hydrogen atom;
$R_a$ and $R_b$ each represents a hydrogen atom, an alkyl group having from 1 to 3 carbon atoms which has a carboxyl group as a substituent, or a hydroxyalkyl group having from 2 to 4 carbon atoms;
λ, m, and p each represents 0 or 1; and
n represents 0, 1, or 2,

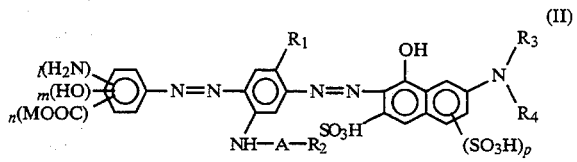

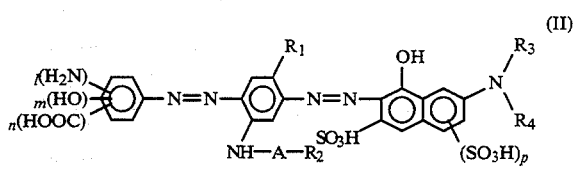

wherein
$R_1$ represents a substituted or unsubstituted alkoxy group having from 2 to 9 carbon atoms;
$R_2$ represents an alkyl group having from 1 to 12 carbon atoms or a substituted or unsubstituted aryl group having from 6 to 12 carbon atoms;
A represents —CO— or —$SO_2$—;
$R_3$ represents a hydrogen atom, a phenyl group which may have a sulfo group or a carboxyl group as a substituent, or an alkyl group having from 1 to 3 carbon atoms which has a carboxyl group as a substituent;
$R_4$ represents a hydrogen atom or an alkyl group having from 1 to 3 carbon atoms which has a carboxyl group as a substituent;
λ, m, and p each represents 0 or 1; and
n represents 1 or 2.

* * * * *

UNITED STATES PATENT AND TRADEMARK OFFICE
CERTIFICATE OF CORRECTION

Page 1 of 2

PATENT NO. : 5,437,716
DATED : August 1, 1995
INVENTOR(S) : Hideo Sano, et. al.

It is certified that error appears in the above-indentified patent and that said Letters Patent is hereby corrected as shown below:

Column 2, line 24, change "$\lambda$" to -- $\ell$ --.

Column 2, line 46, change "$\lambda$" to -- $\ell$ --.

Column 4, line 37, change "$\lambda$" to -- $\ell$ --.

Column 5, line 7, change "$\lambda$" to -- $\ell$ --.

Column 5, line 14, change "$\lambda$" to -- $\ell$ --.

Column 5, line 20, change "$\lambda$" to -- $\ell$ --.

Column 25, line 24, change "$\lambda$" to -- $\ell$ --.

Column 25, line 49, change "$\lambda$" to -- $\ell$ --.

Column 26, line 10, change "$\lambda$" to -- $\ell$ --.

Column 26, line 54, change "$\lambda$" to -- $\ell$ --.

Column 27, line 66, change "$\lambda$" to -- $\ell$ --.

UNITED STATES PATENT AND TRADEMARK OFFICE
CERTIFICATE OF CORRECTION

PATENT NO. : 5,437,716
DATED : August 1, 1995
INVENTOR(S) : Hideo Sano, et. al.

It is certified that error appears in the above-indentified patent and that said Letters Patent is hereby corrected as shown below:

Column 28, line 36, change "$\lambda$" to -- $\ell$ --.

Column 29, line 1, change "$\lambda$" to -- $\ell$ --.

Column 29, line 21, change "$\lambda$" to -- $\ell$ --.

Column 29, line 37, change "$\lambda$" to -- $\ell$ --.

Column 30, line 27, change "$\lambda$" to -- $\ell$ --.

Column 30, line 62, change "$\lambda$" to -- $\ell$ --.

Signed and Sealed this

Twenty-sixth Day of November 1996

Attest:

BRUCE LEHMAN

*Attesting Officer*   *Commissioner of Patents and Trademarks*